(12) United States Patent
Boutteloup et al.

(10) Patent No.: US 7,995,577 B2
(45) Date of Patent: Aug. 9, 2011

(54) METHODS OF BROADCASTNG AND RECEIVING SCRAMBLED MULTIMEDIA PROGRAMS, A TERMINAL AND A NETWORK HEAD END FOR SAID METHODS

(75) Inventors: Philippe Boutteloup, Liffre (FR);
Philippe Carles, Meudon (FR);
Anthony Chevallier, Saint Cyr l'Ecole (FR); Frédéric Gaviot, Paris (FR);
Sébastien Hervieu, Paris (FR); Vincent Priou, Brece (FR); Jean Thominet,
Betton (FR)

(73) Assignee: Viaccess, Paris la Defense Cedex (FR)

( * ) Notice: Subject to any disclaimer, the term of this patent is extended or adjusted under 35 U.S.C. 154(b) by 154 days.

(21) Appl. No.: 12/299,669

(22) PCT Filed: May 7, 2007

(86) PCT No.: PCT/FR2007/000780
§ 371 (c)(1),
(2), (4) Date: Jan. 26, 2009

(87) PCT Pub. No.: WO2007/128922
PCT Pub. Date: Nov. 15, 2007

(65) Prior Publication Data
US 2009/0303995 A1    Dec. 10, 2009

(30) Foreign Application Priority Data
May 9, 2006 (FR) .................................. 06 04081

(51) Int. Cl.
*H04L 12/28* (2006.01)
(52) U.S. Cl. ........ 370/390; 370/312; 370/389; 709/223; 713/163
(58) Field of Classification Search .................... None
See application file for complete search history.

(56) References Cited

U.S. PATENT DOCUMENTS

| 6,629,243 | B1 | 9/2003 | Kleinman et al. | |
| 6,801,936 | B1 * | 10/2004 | Diwan | 709/219 |
| 2002/0152293 | A1 * | 10/2002 | Hahn et al. | 709/223 |
| 2009/0019512 | A1 * | 1/2009 | Stone et al. | 725/132 |

* cited by examiner

*Primary Examiner* — Ayaz R Sheikh
*Assistant Examiner* — Nicholas Sloms
(74) *Attorney, Agent, or Firm* — B. Aaron Schulman, Esq.; Terry L. Wright, Esq.; Stites & Harbison PLLC

(57) ABSTRACT

The invention concerns a method for broadcasting a plurality of multimedia programmes generated by operators of different services, whereby one or more network headends broadcast (in 102) on a reference multicast address a list associating identifiers of service operators with at least one first level service multicast address, the reference multicast address being previously known to all the terminals capable of receiving and multiplexing broadcast multiplexed contents and said reference multicast address being different from all the broadcasting multicast addresses.

9 Claims, 4 Drawing Sheets

METHODS OF BROADCASTNG AND RECEIVING SCRAMBLED MULTIMEDIA PROGRAMS, A TERMINAL AND A NETWORK HEAD END FOR SAID METHODS

The present invention relates to methods of broadcasting and receiving scrambled multimedia programs, and to terminals and network head ends for implementing said methods.

To be more precise, methods exist for broadcasting via a network multimedia programs generated by different service operators. In existing broadcasting methods:
- each network head end multiplexes one or more multimedia programs scrambled using a control word and a cryptogram of that control word to obtain a multiplexed content and then broadcasts the multiplexed content to the terminals via the network; and
- in parallel with this, one or more network head ends broadcast(s) service messages specific to each service operator for adapting the operation of each terminal so that it is authorized or prohibited to access the multimedia programs.

There also exist methods of receiving multimedia programs broadcast by the above broadcasting method.

In existing receiving methods:
- each terminal receives and demultiplexes the multiplexed content and then, provided that it is authorized to do so, decrypts the cryptogram of the control word and descrambles the multimedia program to obtain a multimedia stream that can be used by the terminal, which includes a memory; and
- each terminal receives the service messages and then, as a function of the content of the service message received, the terminal adapts its operation so as to be authorized or prohibited to access the multimedia program.

Existing broadcasting and receiving methods use a broadband network, for example, such as a microwave or satellite network or an IP telecommunications network, for example.

In existing broadcasting and receiving methods, the service messages of a particular operator are incorporated into the multiplexed content and then broadcast to each of the terminals. The same operator can generate a number of multimedia programs, which can lead to the parallel broadcasting of different multiplexed contents by the same service operator. In contrast, the terminal can generally receive and demultiplex only one multimedia content at a time.

Thus if this operator wishes to send a service message to all the terminals able to receive and to demultiplex one or more of the multiplexed contents that they are broadcasting, they incorporate a copy of the same service message in each of the multiplexed contents broadcast in parallel. This therefore increases the number of copies of the same service message broadcast and therefore increases the bandwidth necessary to broadcast them. This problem exists even if the operator groups their multimedia programs into a smaller number of multiplexes, as the service messages are incorporated in that many multiplexes.

The problem is exactly the same if the network used is an IP network, for example. The multiplexed contents and the service messages are then broadcast to multicast addresses to which each of the terminals listens.

The invention aims to solve this problem when the broadcasting and receiving methods use a broadband network in which information can be routed to a multicast address so that only one group consisting of several terminals corresponding to that multicast address receives the information, and other terminals connected to the same network do not receive the information.

The invention therefore consists in a method of broadcasting multimedia programs in which the network head end(s) broadcast(s) to a reference multicast address a list associating service operator identifiers with one or more first-level service multicast addresses, the reference multicast address being known beforehand to all terminals adapted to receive and demultiplex the broadcast multiplexed contents and that reference multicast address being different from all the broadcast multicast addresses.

The invention also consists in a method of receiving multimedia programs broadcast by means of the above broadcasting method in which, in response to broadcasting the list to the reference multicast address, the terminal listens at one or more first-level service multicast addresses specified in that list to receive service messages.

In the above methods, the reference address is different from all the broadcasting multicast addresses. Accordingly, whatever the number of multiplexed contents broadcast in parallel on behalf of the same service operator, only one copy of the list is broadcast to the reference multicast address in order to be received by all the terminals. This is referred to as broadcasting the list "out of band". In particular this saves on bandwidth.

Moreover, because the reference multicast address is used to indicate to the terminals which service multicast addresses to listen to and is not directly and systematically used to transmit all service messages of all service operators, the option of managing the quantity of information transmitted to that reference multicast address can be retained. For example, the service multicast addresses specified by the list can all be different from the reference address, and so no service message is transmitted to the reference address, which considerably reduces the amount of information transmitted to that address. Conversely, if the list associates the reference address with each service operator identifier, all service messages of the operators, which can constitute a large amount of information, are transmitted to the reference address.

Implementations of the broadcasting method can have one or more of the following features:
- the network head end(s) broadcast(s) to the reference multicast address a list in which one or more service multicast addresses associated with an operator identifier differ(s) from the other service multicast addresses associated with other service operators;
- the network head end(s) broadcast(s) to one or more first-level service multicast addresses associated with a service operator identifier a table defining one or more second-level service multicast addresses used by that operator.

Implementations of the receiving method can have one or more of the following features:
- the terminal selects in the list the service multicast address(es) corresponding to a service operator identifier pre-stored in its memory, then listens at the selected service multicast addresses to receive service messages and does not listen at the multicast addresses not selected from this list;
- in response to the broadcasting of the table, the terminal listens at one or more second-level service multicast addresses specified in that table;
- the first- or second-level service multicast addresses are also all different from the broadcast multicast addresses;
- the broadband network is an IP (Internet Protocol) network.

These implementations of the broadcasting and receiving methods have the following advantages:

using different service multicast addresses for different operators is a simple and fast way to eliminate at the network layer level messages that are not relevant to the terminal;

because a table is used to define the second-level service multicast addresses it is possible to use hierarchically organized service multicast addresses, which simplifies management of those addresses; and using service multicast addresses different from all the broadcasting addresses makes it possible to limit the bandwidth necessary for broadcasting service messages.

The invention also consists of a terminal including an access control software module adapted to implement the above receiving method.

The invention further consists of a network head end adapted to broadcast scrambled multimedia programs using the above broadcasting method.

The invention can be better understood on reading the following description, which is given by way of non-limiting example only and with reference to the drawings, in which.

Figure 1:
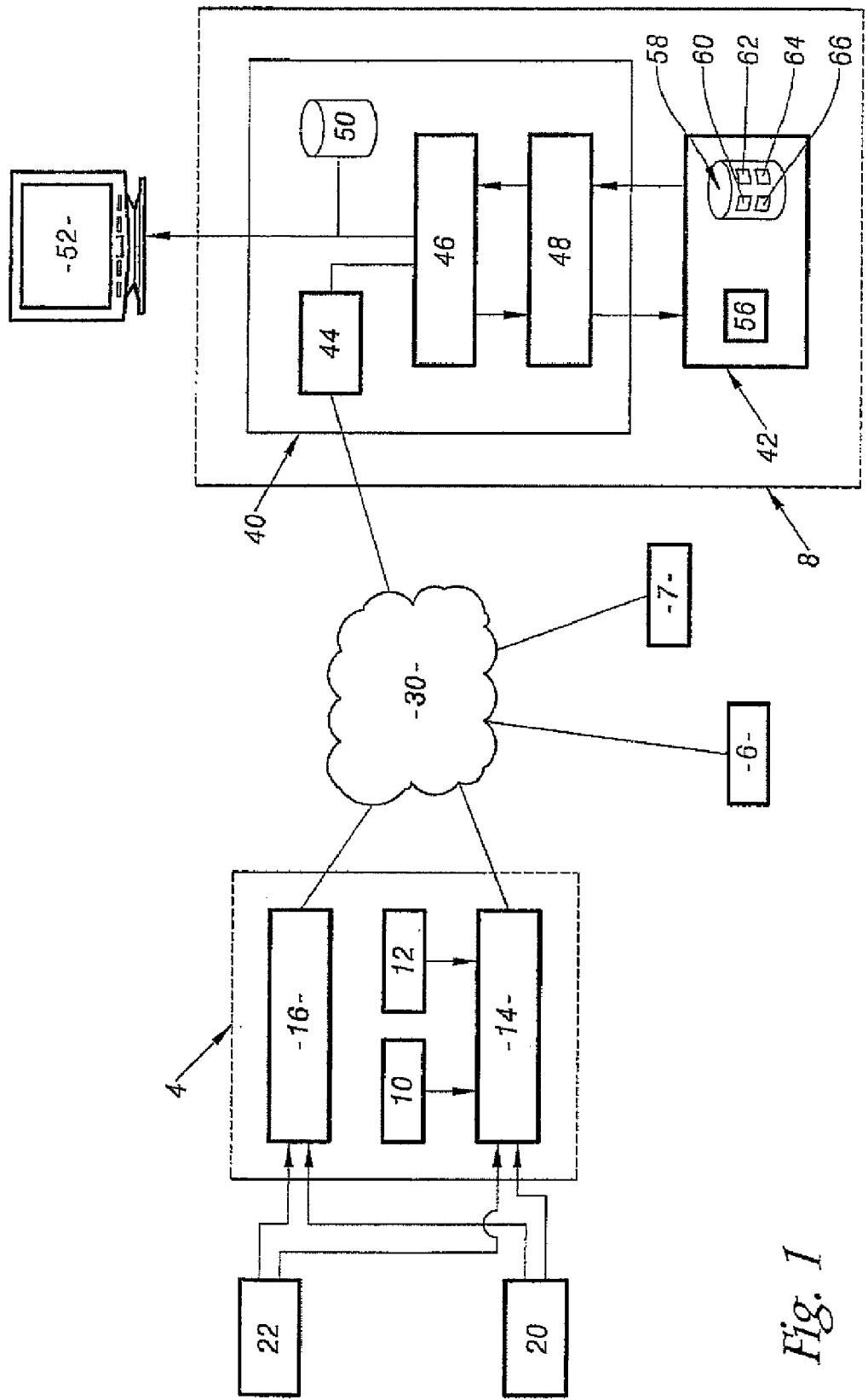
FIG. 1 is a diagram showing the architecture of a system for broadcasting and receiving scrambled multimedia programs.

FIG. 1 shows a system 2 for broadcasting and receiving multimedia messages. This system 2 includes one or more network head ends that broadcast(s) multimedia programs in a scrambled form and a multitude of terminals that receive the scrambled multimedia programs and descramble them so that they can use them. For example, the terminal uses the received multimedia programs to generate a video stream that can be displayed in clear on a screen.

To simplify FIG. 1, only one network head end 4 and three terminals 6, 7 and 8 are shown.

The network head end 4 comprises:
an entitlement control message (ECM) generator 10;
an entitlement management message (EMM) generator 12;
a module 14 adapted to broadcast the multiplexed contents to one or more broadcast multicast addresses; and
a private messaging manager (PMM) 16 able to broadcast service messages to one or more service multicast addresses.

The module 14 scrambles each multimedia program received using a control word CW. The module 14 also multiplexes the scrambled multimedia program with entitlement control messages generated by the generator 10 and entitlement management messages generated by the generator 12 in order to obtain a multiplexed content. The entitlement control messages multiplexed with the scrambled multimedia program typically contain a cryptogram CW* of the control word CW used to scramble the multimedia program. The entitlement control messages also generally contain access conditions associated with the scrambled multimedia program.

The entitlement management messages generally contain information, such as keys or entitlements, for authorizing or prohibiting correct descrambling by a terminal of scrambled multimedia programs it has received so that it can use them.

Here the module 14 is adapted to encapsulate each multiplexed content in IP (Internet Protocol) frames.

Here the multimedia programs are generated by different service operators. To simplify FIG. 1, only two operators 20 and 22 are shown.

It is assumed here that each of the operators 20 and 22 is able to generate simultaneously a plurality of multimedia programs, so that the module 14 generally broadcasts a number of multiplexed contents for the same operator.

The service messages broadcast by the manager 16 contain information necessary for the terminals to function correctly and in particular so that they can use the broadcast multimedia programs. These service messages can also contain information for barring use of the broadcast multimedia programs.

For example, a service message sent to a terminal is a request to that terminal to set up a connection with a dedicated server of the network head end of the operator to effect a particular transaction. In another example, by means of an appropriate service message, the operator activates a security mechanism specific to the terminal. In a third example, a service message constitutes complementary means of the operator for transmitting to a terminal an entitlement management message containing a particular entitlement.

Service messages are generally different from one service operator to another. Here the service messages are generated in response to commands transmitted by the operators 20 and 22.

The network used to transmit multiplexed contents and service messages to the terminals is an IP (Protocol) broadband network 30. This protocol uses routers to route a frame of information to a specified address. The Internet Protocol uses a multicast address to set up a point-to-multipoint connection. This kind of multicast address differs from a broadcast address in that the information frames are routed only to a limited group of terminals connected to the network 30. The multicast address is also different from a unicast address, which is used only to set up a point-to-point connection.

It is assumed here that the terminals 6, 7 and 8 are identical, and only the terminal 8 is described in more detail.

The terminal 8 includes a receiver 40 associated with a removable security processor 42.

The receiver 40 is includes a modem 44, a demultiplexer-descrambler-decoder module 46 and an access control logic module 48.

The receiver 40 also includes a memory 50 for storing received multimedia programs.

The modem 44 is connected to the network 30 and receives multiplexed contents and service messages broadcast by the network head end 4.

The module 46 in particular demultiplexes received multiplexed contents, sends entitlement control messages and entitlement management messages to the module 48, and descrambles scrambled multimedia programs to generate a usable multimedia stream, for example by decoding it and then displaying it in clear on a screen 52 connected to the terminal 8.

The module 48 provides the interface with the processor 42. In particular, it sends entitlement control messages and entitlement management messages to the processor 42 and receives from the processor 42 the decrypted control word that the module 46 uses to descramble the received multimedia programs.

The processor 42 is a smart card, for example, and executes all security operations and controls access to the multimedia programs. To this end, it includes an encryption and decryption module 56 and a non-volatile memory 58. The memory 58 contains:
- access entitlements and keys 60;
- a list 62 of identifiers of service operators with which the user of the terminal 8 has a contract;
- a reference multicast address @ASP 64; and
- a service multicast address tree 66.

The operation of the system 2 is described below in relation to the method described with reference to FIG. 2 and with the aid of the data structures shown in FIGS. 4 to 6.

The network head end 4 executes a process 76 for broadcasting scrambled multimedia programs and each terminal executes a process 78 for receiving those scrambled multimedia programs.

The network head end 4 broadcasts a scrambled multimedia program as follows:
- in a step 80, the module 14 scrambles the multimedia program to be broadcast using the control word CW;
- in a step 82, the control word CW is encrypted using an encryption key $K_m$ to obtain the cryptogram CW*;
- in a step 84, the generator 10 generates the entitlement control message containing the cryptogram CW* and conditions for access to the scrambled multimedia program;
- in a step 86, entitlement management messages containing the key $K_m$, for example, can be generated by the generator 12;
- in a step 88, the module 14 multiplexes the scrambled multimedia program, the entitlement control messages, and the entitlement management messages to obtain a multiplexed content;
- in a step 90, the module 14 encapsulates the multiplexed content in IP (Internet Protocol) packets;
- in a step 92, the IP packets containing the multiplexed content are broadcast to a predefined broadcasting multicast address by the operator that generated the scrambled multimedia program.

The steps 80 to 92 are repeated for each multimedia program of each service operator.

In parallel with this, the network head end broadcasts service messages.

Figure 3:
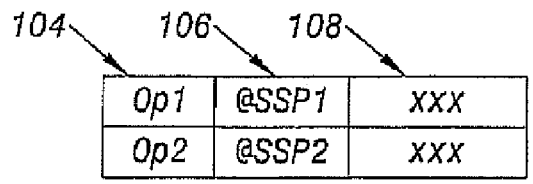
FIG. 3 is a diagram showing the structure of a list used in the FIG. 2 method.

To be more precise, in a step 100, the manager 16 generates an ASP (Address Signaling Protocol) message and encapsulates it in a UDP (User Datagram Protocol (RFC768)) datagram. This ASP message contains a list associating one or more service multicast addresses, referred to as first-level addresses, with service operator identifiers. One example of a structure for this list is shown in FIG. 3. The service operator identifiers are in a column 104. For each service operator identifier, there is a first-level service multicast address in a column 106. Sufficient data is present in the columns 104 and 106. Complementary data specific to a particular implementation can be associated with it, however, as shown in the column 108.

In FIG. 3, "Op1" and "Op2" are the identifiers of the operators 20 and 22, respectively. These identifiers Op1 and Op2 are associated with service multicast addresses @SSP1 and @SSP2, respectively. In this example, each identifier from column 104 is further associated with a description of the service operator in column 108, represented by the symbol "xxx", which can be displayed on the terminal.

Then, in a step 102, the ASP message is broadcast to the multicast address @ASP. This address @ASP is stored beforehand in each of the terminals liable to access a multimedia program broadcast by the network head end 4. This address @ASP is the same for all the terminals, regardless of the operator with which the user of the terminal has a contract. Thus all the terminals of the system 2 can receive the ASP message.

The reference address @ASP is an IP address associated with a port to be listened to or a domain name. The address @ASP is different from all the broadcast multicast addresses used to broadcast multimedia contents and is used to exchange information "out of band".

The steps 100 and 102 are repeated, for example at intervals of one minute.

Then, in a step 110, the manager 16 generates SSP (Service Status Protocol) messages specific to each of the operators and encapsulates them in UDP datagrams. Here the SSP message specific to each operator contains a table relating to the services provided by that operator and concerning the terminals. These services are, for example:
- broadcasting of individual or collective information to the terminals in multicast mode by the operator; for this kind of service the SSP message specifies the broadcasting modes, in particular a second-level service address, that a terminal must use to access this information;
- the exchange of information between the operator and the terminal during transactions resulting from a connection set up at the initiative of the terminal; for this kind of service the SSP message specifies how to set up the connection;
- the activation of particular behaviors of the terminal.

Figure 4:
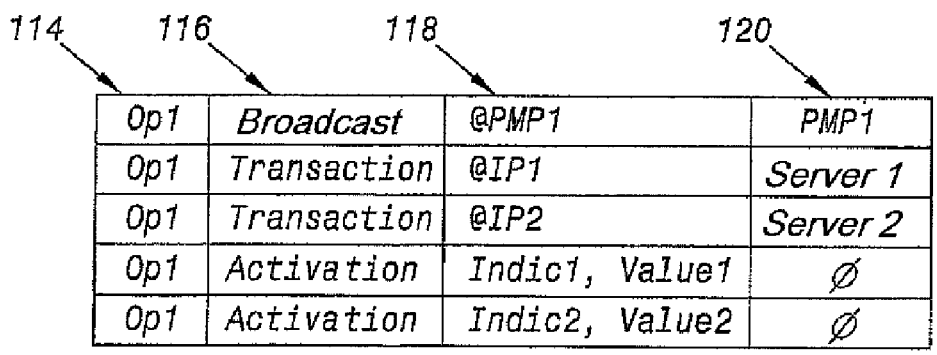
FIG. 4 is a diagram showing the structure of a table used in the FIG. 2 method.

FIG. 4 shows one example of this kind of table for the operator 20.

The FIG. 4 table contains:
- in a column 114, the identifier of the service operator that generated the table;
- in a column 116, the type of each service;
- in a column 118, the parameters of each service; and
- in a column 120, the identifiers of each service.

The natures of the service parameters 118 and the service identifiers 120 depend on the type of service, for example: reference of the message broadcast service and its multicast address, reference of the server to be called and its unicast IP address, designation of a specific behavior and its particular parameter settings.

In FIG. 4, column 114 indicates the operator OP1 from which the table originates. Column 116, with the identifiers from the column 120, indicates a service message broadcasting service PMP1, two transactional services Server1 and Server2, and two behavior activation services Indic1 and Indic2.

Column 118 describes the parameters of each of these services:
- for the service message broadcasting service PMP1, the column 118 gives the multicast address @PMP1; this address @PMP1 is used by the generator 16 under the control of the operator 20 to broadcast particular service messages, for example requests for connection of the terminal to the network head end;
- for each transactional service Server1, respectively Server2, the column 118 specifies the unicast address @IP1, respectively @IP2, to which the terminal must be connected by a point-to-point connection to execute a transaction with a server of the operator; the choice of server depends on the nature of the transaction to be executed;
- for each behavior activation service, the column 118 specifies the behavior Indic1, respectively Indic2, to be activated and the parameters Value1, respectively Value2, of that activation.

In a step 122, an SSP message generated by the operator 20 is broadcast to the address @SSP1 defined in the FIG. 3 list. Similarly, SSP messages generated by the operator 22 are broadcast to the address @SSP2 associated with the identifier of that operator in the FIG. 3 list.

The SSP messages of an operator are broadcast at intervals of one minute, for example.

Finally, in a service message broadcasting service, at the command of the operator 20, the generator 16 sends a PMP (Private Message Protocol) message in a step 126 that preferably contains the identifier of the terminal for which it is intended and the identifier of the operator that generated it. For example, the PMP message intended for a terminal can be a request for connection to a server of the operator whose address the terminal has received via a transaction-type SSP service.

Note that, depending on the implementation, the service at the SSP behavior activation level can be supported by a particular PMP message.

In the step 126, under the control of the operator 22, the manager 16 can also send to a service multicast address @PMP2 a service message containing a connection request. The address @PMP2 is the address associated with the identifier PMP2 in column 120 of the table broadcast in the step 122 by the operator 22. The address @PMP2 is preferably different from the address @PMP1.

Moreover, in practice, all the addresses used to broadcast service messages, i.e. the addresses @SSP1, @SSP2, @PMP1, and @PMP2 here, are each different from the broadcast multicast addresses used to broadcast multiplexed contents in the system 2.

In parallel with the steps 80 to 126, each terminal executes the process 78 for receiving multimedia programs and service messages.

Initially, in a step 130, the terminal 8 looks up the address @ASP in its memory 58 and then listens at that multicast address. Then, in a step 132, it receives the ASP message broadcast by the network head end 4. In a step 134, in response to reception of this ASP message, the terminal selects only addresses in column 106 that are associated with a service operator identifier matching one contained in its own list 62.

Then, in a step 136, the terminal listens only at the addresses from the FIG. 3 list selected in the step 134.

It is assumed here that the terminal 8 listens only at the address @SSP1 of the operator 20.

By listening at that address, in a step 138, the terminal receives the SSP message broadcast by the operator 20.

In response to that SSP message, in a step 140, the terminal stores the table contained in the SSP message received. The table can be stored on reception of each message or only when the content has changed relative to the last time it was broadcast. The values of the indicators contained in the stored table are used during special processing operations.

The unicast addresses @IP1 and @IP2 contained in the column 118 are used to set up a point-to-point connection with the server corresponding to them.

In response to reception of the address @PMP1, in a step 142, the terminal 8 begins to listen at that service address.

In a step 144, the terminal receives the PMP messages by listening to the address @PMP1. For example, the terminal receives a connection request. Then, in a step 146, the terminal verifies that this connection request was generated by the operator 20 and is intended for it. For example, in the step 146, the terminal verifies that:

the operator identifier contained in this request matches one of those stored in its list 62; and the terminal identifier contained in the request matches its own terminal identifier.

If not, the next step is the step 142; if so, the terminal proceeds to a step 148 of setting up a point-to-point connection.

In the step 148, the terminal sets up a point-to-point connection to a server of the operator 20. To set up this point-to-point connection, the terminal uses one of the unicast addresses contained in the table stored in the step 140 corresponding to the service specified in the connection request.

Once this point-to-point connection has been set up, in a step 150, an exchange of bidirectional data between the terminal and the contacted server is executed. This bidirectional exchange of data can, for example, provide the terminal 8 with the secret data enabling it to descramble received scrambled multimedia programs.

In parallel with the steps 130 to 150, the terminal also receives the broadcast scrambled multimedia programs. To this end, in a step 160, the terminal listens at a broadcast multicast address and the module 46 then demultiplexes the received multiplexed content. Then, in a step 162, the entitlement control message of the multiplexed content is sent to the processor 42 which, in a step 168, obtains the control word CW by decrypting the cryptogram CW*.

The processor then sends the control word CW to the module 46 which, in a step 170, descrambles the scrambled multimedia program using the received control word.

The descrambled multimedia program is then decoded, in a step 172, by the module 46 in order to generate a multimedia stream. In a step 174, that multimedia stream is sent to the screen 52, which displays it in clear. The steps 172 and 174 constitute one example of use of the descrambled multimedia program.

Figure 2:
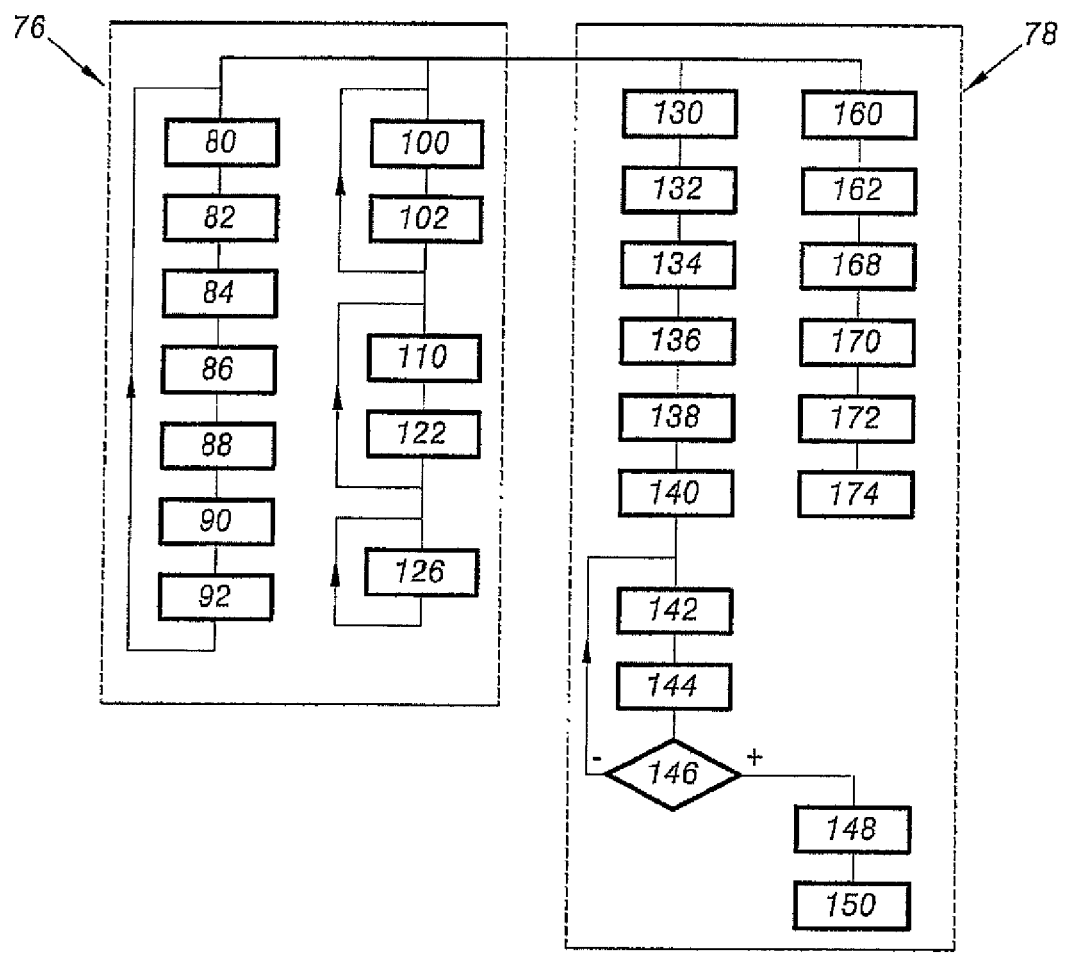
FIG. 2 is a flowchart of a method of broadcasting and a method of receiving scrambled multimedia programs.
Figure 5:
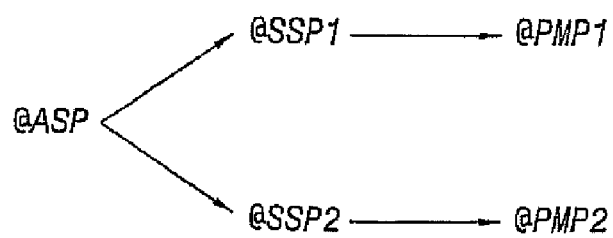
FIG. 5 is a diagram showing the architecture of a service multicast address tree used in the FIG. 2 method.

The FIG. 2 method is used to construct a tree of service multicast addresses for each operator as shown in FIG. 5. In that tree, the address @ASP is the root node. The addresses @SSP1 and @SSP2 are the first-level son nodes and the addresses @PMP1 and @PMP2 are the second-level son nodes respectively attached to the addresses @SSP1 and @SSP2.

The FIG. 2 method can of course be used to construct service multicast address trees containing more than two first-level service multicast addresses and more than one second-level service multicast address associated with each father node.

Figure 6:
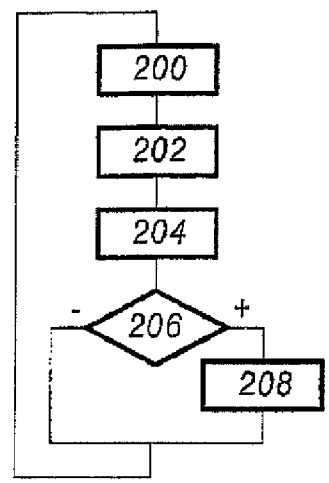
FIG. 6 is a flowchart of a method of modifying a reference address in the FIG. 1 system.

FIG. 6 is a flowchart of a method of modifying the address @ASP in each of the terminals of the system 2.

Initially, in a step 200, the network head end broadcasts the ASP messages at the same time to the old address @ASP, here denoted @$ASP_{old}$, and to a new address @ASP, here denoted @$ASP_{new}$. The step 200 applies the FIG. 2 method to a heterogeneous installed base of terminals in which some terminals use the address @$ASP_{old}$ and the other terminals use the address @$ASP_{new}$.

Then, in a step 202, a reference address modification entitlement management message is sent to each of the terminals. This entitlement management message can be incorporated into the multiplexed content received by this terminal or sent in a service message generated by the generator 16. It contains the new address @$ASP_{new}$.

In response, in a step 204, each terminal stores the new address @$ASP_{new}$ instead of the old address @$ASP_{old}$.

Then, in a step 206, the receiver 40 verifies that the new address has been stored correctly by testing the value of an update indicator, the value of which is modified by the processor 42 in the event of successful storage of the new address @$ASP_{new}$. If the value of this indicator shows that the update has succeeded, the terminal proceeds to a step 208 of listening at the new address @ASP$_{new}$ and no longer listens at the old address @ASP$_{old}$.

If, in the step 206, the value of the indicator shows that the update has not succeeded, the terminal does not proceed to the step 208 and continues to listen at the address @ASP$_{old}$.

In all cases, the method returns to the step 200 after the step 206 or the step 208.

Figure 7:
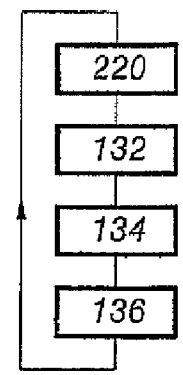
FIG. 7 is a flowchart of a method of updating first-level service multicast addresses in the FIG. 1 system.

How the terminal 8 updates the address @SSP1 is described below with reference to FIG. 7.

Initially, in response to a modification of the address @SSP1 contained in the ASP message, in a step 220, the module 48 stops listening to the first-level multicast addresses (@SSP1) and the higher level multicast addresses, such as the address @PMP1.

The method then continues through the steps 132, 134 and 136 described with reference to FIG. 2.

Figure 8:
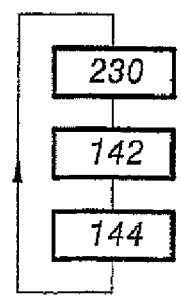
FIG. 8 is a flowchart of a method of updating second-level service multicast addresses in the FIG. 1 system.

How the terminal 8 responds to receiving an SSP message informing it of a new address @PMP1$_{new}$ is described below with reference to FIG. 8.

Initially, in a step 230, in response to reception of this new address @PMP1$_{new}$, the module 48 stops listening at the old address @PMP1$_{old}$. The method then continues through the steps 142 and 144 described with reference to FIG. 2.

Numerous other embodiments are feasible. For example, networks other than those using the Internet Protocol can be used instead of the network 30 provided that the network in question uses multicast addresses in a similar way to the Internet Protocol.

The security processor 42 can be integrated into the receiver 40. Alternatively, the modules 46 and 48 can be implemented in a removable module.

The various functions of the terminal 8 can be divided between different units interconnected by a local area network. For example, they can be divided between a local "home gateway" and a local decoder, one of which can include the security processor 42. The gateway is then the element connected to the network 30 that listens at the various multicast addresses. Information received from the network 30 is then forwarded over the local area network to the local decoder. For example, in this kind of architecture, the gateway can be responsible for processing the entitlement control messages to extract from them the control words necessary for descrambling scrambled multimedia programs. Other architectures for the terminal 8 are obviously feasible.

The multicast addresses of the first and higher levels can be IP addresses that are either fixed or assigned dynamically by the FIG. 2 method. The addresses @SSP1 and @SSP2 can be identical. The terminal then distinguishes service messages intended for it by means of an identifier of the carrier contained in the SSP messages. Similarly, the second-level service multicast addresses can be identical to each other and also identical to the first-level service multicast addresses. Service messages intended for the terminal 8 are then distinguished from those that are not intended for it by carrier identifiers included in the SSP and PMP messages. The address @ASP can also be identical to or different from the service multicast addresses used.

The modem 44 can be integrated into the receiver 40 or an external modem.

Alternatively, the address @ASP is stored in the receiver 40 instead of in the security processor 42.

The FIG. 2 method has been described in the particular situation where the FIG. 5 tree comprises three levels. A simplified version uses only two levels, that is to say the address @ASP and the first-level service multicast addresses. Alternatively, more than three levels can be used. This variant enables different service multicast addresses to be assigned, typically according to the service message types and/or the organization of the installed base of terminals.

If each service operator uses a set of service multicast addresses different from that used by the other operators, then the operator identifier contained in the FIG. 4 table can be omitted. Similarly, the operator identifier contained in the SSP, PMP service messages can be omitted.

The description of the operator or the service contained in columns 108 and 120, respectively, can be omitted.

The invention claimed is:

1. A method of broadcasting multimedia programs generated by different service operators via a broadband network in which information can be routed to a multicast address so that only one group of terminals corresponding to that multicast address receives the information whereas other terminals connected to the same network do not receive that information, in which method:

each network head end multiplexes a multimedia program scrambled using a control word and a cryptogram of that control word in order to obtain a multiplexed content and then broadcasts the multiplexed content to a broadcast multicast address used to set up a point to point multipoint connection between the network head end and the terminals via the network; and one or more network head ends broadcast(s) service messages specific to each service operator in parallel to one or more service multicast addresses to adapt the operation of each terminal so that it is capable of descrambling and using the broadcast multimedia program or, to the contrary, to disable that capability;

wherein the network head end(s) broadcast(s) to a reference multicast address a list associating service operator identifiers with one or more first level service multicast addresses, the reference multicast address being known beforehand to all terminals adapted to receive and demultiplex the broadcast multiplexed contents and that reference multicast address being different from all the broadcast multicast addresses; and wherein each terminal receives the multiplexed content by listening at a broadcast multicast address, demultiplexes the multiplexed content, and then, provided that it is authorized to do so, decrypts the cryptogram of the control word, descrambles the multimedia program, and uses the descrambled multimedia program, the terminal including a memory and being adapted to listen simultaneously at a number of multicast addresses; and each terminal receives service messages by listening at the service multicast address(es) as a function of the content of the service message received and the terminal adapts its operation so as to be capable of descrambling and using the broadcast multimedia program or, to the contrary, to disable that capability; and in response to broadcasting the list to the reference multicast address, the terminal listens at one or more first level service multicast addresses specified in that list to receive service messages.

2. A method according to claim 1, wherein the network head end(s) broadcast(s) to the reference multicast address a list in which one or more service multicast addresses associated with an operator identifier differ(s) from the other service multicast addresses associated with other service operators.

3. A method according to claim 1, wherein the network head end(s) broadcast(s) to one or more first level service multicast addresses associated with a service operator identifier a table defining one or more second level service multicast addresses used by that operator.

4. A method according to claim 1 for receiving multimedia programs broadcast using the network head end(s) broadcast(s) to the reference multicast address a list in which one or more service multicast addresses associated with an operator identifier differ(s) from the other service multicast addresses associated with other service operators, wherein the terminal selects in the list the service multicast address(es) corresponding to a service operator identifier prestored in its memory, then listens at the selected service multicast addresses to receive service messages and does not listen at the multicast addresses not selected from this list.

5. A method according to claim 1 for receiving multimedia programs broadcast using the network head end(s) broadcast(s) to one or more first level service multicast addresses associated with a service operator identifier a table defining one or more second level service multicast addresses used by that operator, wherein, in response to the broadcasting of the table, the terminal listens at one or more second level service multicast addresses specified in that table.

6. A method according to claim 1, wherein the first or second level service multicast addresses are also all different from the broadcast multicast addresses.

7. A method according to claim 1, wherein the broadband network is an IP (Internet Protocol) network.

8. A terminal for receiving scrambled multimedia programs, including an access control software module adapted to implement a reception method according to claim 1.

9. A network head end adapted to broadcast scrambled multimedia programs, wherein it is adapted to use a broadcasting method according to claim 1.

* * * * *